Dec. 4, 1934.   T. A. KEEN   1,983,376
DOG STARTING APPARATUS
Filed April 20, 1931   2 Sheets-Sheet 1
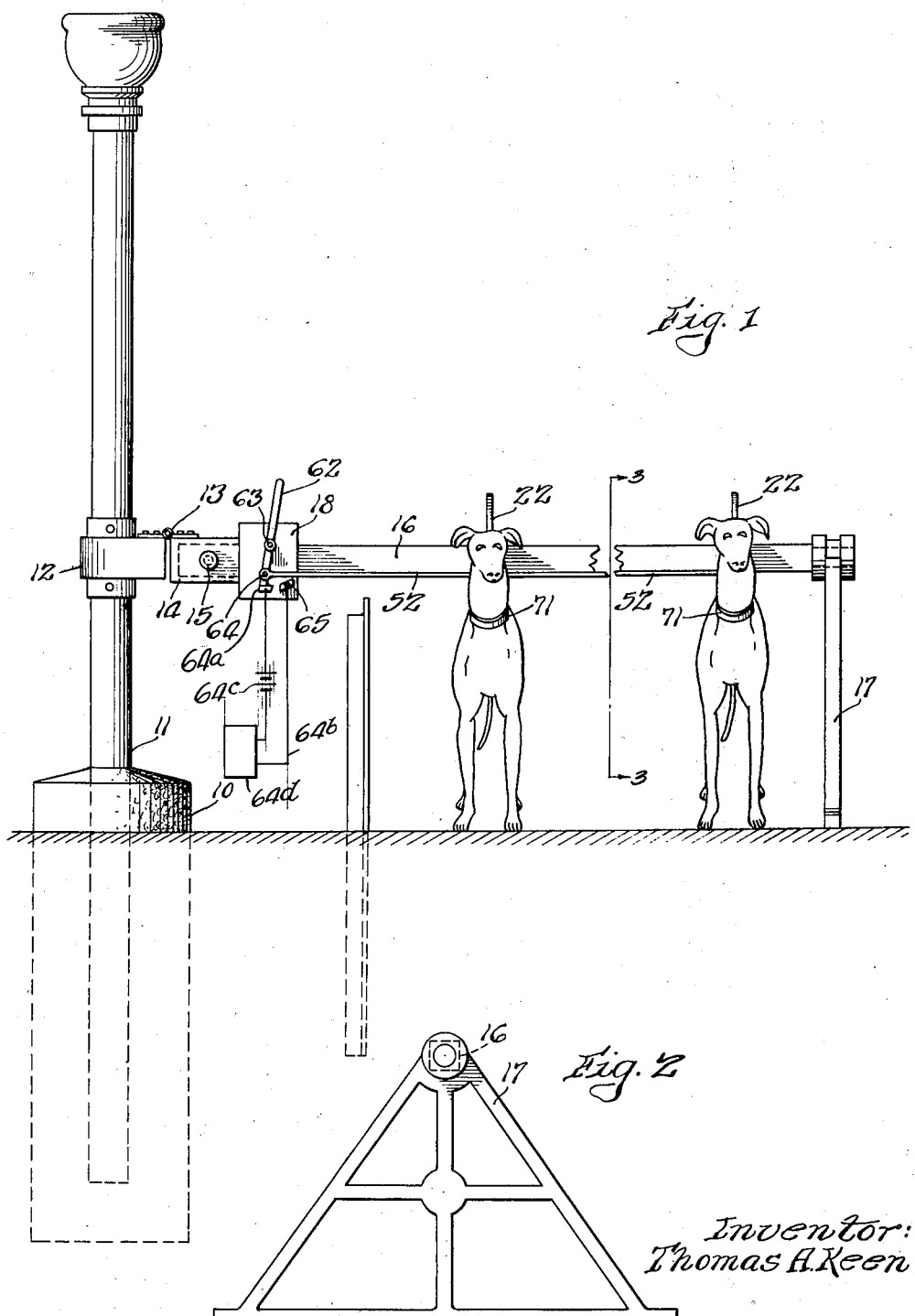

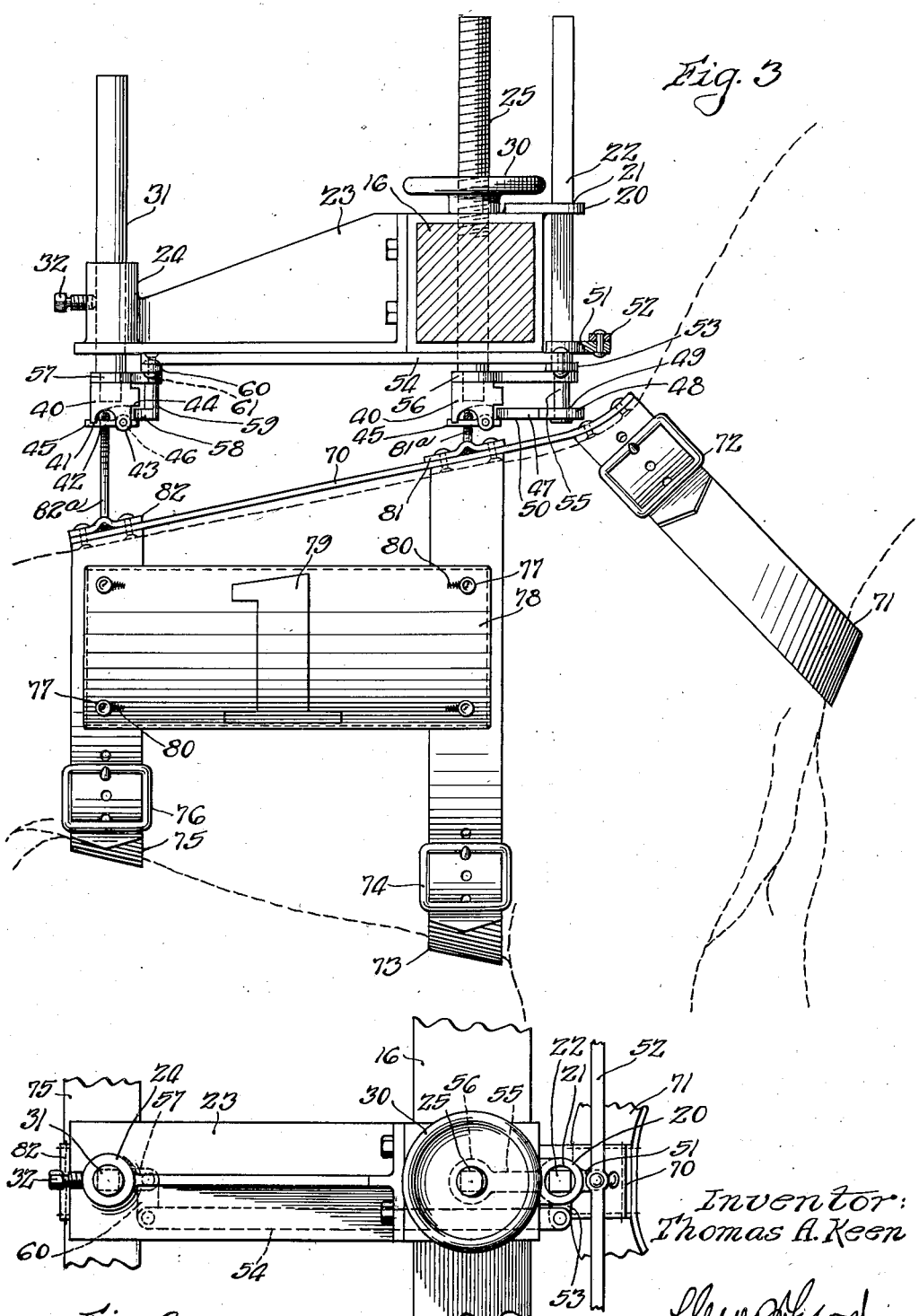

Patented Dec. 4, 1934

1,983,376

UNITED STATES PATENT OFFICE 1,983,376

DOG STARTING APPARATUS

Thomas A. Keen, St. Louis, Mo., assignor to Hannah M. Smith, River Forest, Ill.

Application April 20, 1931, Serial No. 531,389

13 Claims. (Cl. 119—15.5)

The present invention relates to dog racing apparatus and has particularly to do with a starting means.

One of the objects of the invention is to provide a simplified dog starting apparatus.

Another object of the invention is to employ the harness usually applied to a dog in a race for holding identifying numbers as a part of a starting apparatus.

Another object of the invention is to provide a new and unique dog starting apparatus in which a part of the starting apparatus is the harness used to identify the dog during the course of a race.

A further object of the invention is to provide an improved means for starting dogs in which the starting apparatus operates directly upon a harness carried by the dog during the race.

These objects, and such other objects as may hereinafter appear, are obtained by the novel construction, unique arrangement, and improved combination of the several elements constituting the invention, a single embodiment of which is illustrated in the accompanying drawings, in which:

Figure 1 is a front elevation of an apparatus embodying the present invention but two dogs being shown;

Figure 2 is an end elevation in which the supporting leg at one end of the linear support for the apparatus is shown in dotted lines;

Figure 3 is an enlarged detail of one of the dog holding members in side elevation as seen from line 3—3 of Figure 1; and Figure 4 is a top view of that portion of the device shown in Figure 3.

Like reference characters are used to designate similar parts in the drawings and in the description of the invention which follows.

The present invention is adapted to be used transversely of a track in a manner such as is shown in Figure 1. Starting posts should be permanently affixed to a track. The distances about the course should be accurately measured, and once measured, the various starting posts should be arranged so that they cannot be displaced.

In a suitable concrete foundation 10, there is disposed an upright post 11. Upon said post 11 is a bearing block 12 which supports one wing of a hinge 13, there being attached to the other wing of said hinge 13 a socket 14 having a central aperture therethrough. There may be secured in said socket 14, by a pin 15 traversing the opposed walls of said socket, a linear member 16 which is also traversed by said pin 15 to maintain it in said socket.

Upon the linear member 16, which is supported at its outer end by a "horse" 17, the dog starting apparatus hereinafter referred to is disposed. As a part of the linear member 16 is a plate or the like 18 upon which operating means for the starting apparatus may be disposed. There may also be a switch mechanism thereon connected to an electric timing element.

In using the dog starting apparatus herein described, the linear member 16, carrying with it the dog starting devices to be used, together with the operating means therefor, and such other items as may be suitably disposed thereupon, is brought to the selected starting point of a race and one end thereof secured in the socket 14 by the pin 15.

The other end of said linear member is supported by the "horse" 17 at the start of the race, but immediately the race is started, the linear member may be rotated upwardly and maintained out of the way until the race is completed and ample time is had to remove the apparatus to another point, if desired. The linear member is pivoted or hinged for such movement by the hinge 13 intermediate the stationary supporting bracket 12 and movable bracket 14.

Suitably spaced along the linear member 16 are devices, each of which is intended to maintain a single dog in position at the starting position in a race until mechanically released. The cross section of the linear member 16 is square as is shown by Figure 2. Extending outwardly from the top thereof for each dog racing harness used is a guide 20. An aperture 21 in said guide surrounds a square rod 22.

Secured to the rear wall of the linear member 16 is a bracket 23. At the rear end of said bracket is a circular bearing suitably reinforced for added strength.

The harness engaging section of the apparatus comprises a threaded rod 25 extending through the linear member 16. By the use of a hand wheel 30 operating upon the thread in the member 25, the height of the front end of the harness holding device may be adjusted relatively to a dog's shoulders. The rear harness holding member depending therefrom is adjustable by telescoping in the circular bearing or hub 24 a shaft 31. Said shaft is adapted to be held in adjusted position by a set screw 32.

The bottom ends of shafts or rods 25 and 31 are square. To these ends are secured latch members. The latch members in respect to the front harness holding member and the rear harness holding member are the same.

Such latch comprises a body having sides 40 secured to the shaft 25 or shaft 31 as the case may be, the under surface of the sides having a cammed periphery comprising from the rear forward, a point 41, an adjacent seat or depression 42, a projection 43, and a shoulder 44. Through the projecting portion 43 is a pivoted latch member 45 having a central boss 46 and front and back extensions.

For actuating the front latch, that is, releasing the pivoted member 45 and also for holding it in latched position, there is a trigger 47 comprising a circular portion 48 through which there may be a square aperture, 49, there being an extension 50 therefrom with a rounded end which is adapted to rotate on a vertical axis and be moved into position beneath the shoulder 44 in the side of the latch member.

When in such position, said trigger is adapted to maintain the latch member 45 in a truly horizontal position. When moved angularly upon its vertical axis, the end or tongue 50 is adapted to be moved out of position against said shoulder 44 whereupon the latch 45 turns upon its horizontal pivot by gravity. It may be pulled about its axis by the urge of a dog straining at the harness to pursue a rabbit which is operating about the track as a lure to cause the dog to run and which has passed the dog anterior to release.

The vertical axis for said locking member is provided by the square rod 22. Said trigger member 47 is suitably secured thereupon for rotation therewith. For actuating said rod 22, there is a link 51 slidably affixed to said rod 22, the end of said link 51 projecting forwardly of the device, where it is adapted to be connected to a connecting rod 52 running the length of the linear member 16. Such connecting rod 52 is adapted to be secured to each succeeding link so that said links may be operated by a single rod member 52.

Also secured to said rod 22 is another link 53 at the end of which is pivoted to a rearwardly extending link 54 whereby the rear harness latch is released. Said rod 22 has a reduced section 55 adapted to ride in a frame member 56 extending from about said section 55 rearwardly about the squared end of shaft 25.

Said link 54 extends rearwardly to and above a rear frame member 57 to which the sides 40 of the rear latch member are secured. The trigger for the rear latch member operates on a vertical axis and has a lip 58 extending beneath the shoulder 44 of the rear latch body and controlling the release of said latch member in said rear latching device in exactly the same manner as the front latching member is controlled.

For actuating the vertical section 59 of said rear release member there is keyed thereto a link 60, the end of which is pivoted to the rearwardly extending link 54. The section 59 has a reduced section 61 secured in frame 57.

The lever for actuating the connecting rod 52 comprises a lever 62 pivoted at 63, there being a pivotal connection 64 intermediate said lever 62 beneath the pivot 63 whereby the connecting rod 52 may be moved longitudinally of the linear member 16. In connection with the lever 62, there may be provided a contact member 64a insulated from lever 62 and which is within an electric circuit including such contact member, a source of electrical energy 64c, a clock or other timing device 64d, and a leg 64b to a complemental contact member 65. The electric circuit shown schematically may be of any suitable combination of contacts, source of energy, clock or timing device, and conductors. When the circuit is closed incident to the bringing of the contact members 64a and 65 together by manipulation of the starting lever 62, the clock 64d is energized by electrical energy from the source 64c.

Movement of the connecting rod 52 opens and closes the latching members by rotating the vertical shafts of the locking devices therefor as is clear from the drawings and the preceding description.

All dogs are not of the same height. Some dogs are proportionately higher in front than in back. The present device provides means for adapting the height of the device as a whole, it being possible to move both the front and back members conjointly.

At the present time, harness is applied to a dog to carry an indicia sheet. Upon the indicia sheet is the racing number of the dog. It is by this means that the public identifies a dog during the course of a race.

The present apparatus includes a harness comprising a top member 70 from which depends a strap 71 at the front thereof to go around a dog's neck with a buckle 72 for proper adjustment at the strap. A second strap 73 extends around the body of a dog adjacent to its front legs. Such strap has a buckle fastening means 74. A third strap 75 extends about the body of a dog adjacent to its rear legs, with a buckle 76 for adjustment. The strap 73 adjacent the front legs and the strap 75 adjacent the rear legs of the dog are parallel and are secured to the top strap 70 of the harness, the strap 73 being secured adjacent to the neck-encircling strap and the strap 75 being near the rear end of said top strap 70.

Upon the parallel strap members 73 and 75, there may be provided spaced apart buttons 77 and upon these may be secured indicia sheets or flags or tags 78 carrying numerals 79, there being button-holes 80 in such flags or indicia sheets facilitating their attachment to the harness.

On the strap member 70 are additional strap members 81 and 82. Between these and strip 70, ring members 81a and 82a adapted to be inserted over the tongues 45 of the latch members in the manner illustrated are held. To secure proper attachment of the dog in the device, the harness holding members may be vertically adjusted. With a dog secured by latches penetrating the rings 81a and 82a in the manner indicated, the dog is held in a position for a quick start, but can only be freed from the apparatus by the release of the latches above referred to. At the proper time, this release is occasioned by the movement of the lever 62 in the manner hereinbefore indicated.

At the close of a race, a dog is captured in the usual manner, and the side indicia sheets 78 are removed if the dog is to participate in a succeeding race (which seldom occurs), or the entire harness may be removed with the number thereon to be placed upon a dog assigned the same number for the next succeeding race. If the harness is used upon a dog in the next succeeding race and the numerals are not correct, there may be a rapid change of numerals by removing the side indicia sheets 78 and placing new and correct side indicia sheets thereon.

By the arrangement shown, the rod 22 always is adapted to be moved by the connecting rod 52 irrespective of the adjustments of the holding means to a dog, for the rod 22 which fits loosely in the square aperture in link 51 is always in position to be actuated by the link 51 which does not change its vertical plane, said link always being in engagement with connecting rod 52. The arrangement shown permits of the front and rear latches being operated with the front and rear latches in different longitudinal planes without difficulty.

In connection with many dogs, it is unnecessary to latch the rear harness strap to the frame therefor for these dogs will stand in proper position without being held at their hind quarters. The rear strap, however, is provided for unruly dogs or beginners, or for those dogs with a tendency to twist or turn or which for other reasons require additional fastening means.

I claim:

1. Dog starting apparatus comprising a harness having extensions spaced longitudinally of the dog, a plurality of latch members engaging said extensions, and means for simultaneously releasing said latch members.

2. In a dog starting apparatus, a linear member, transverse extensions thereon at spaced intervals, latching means secured to said linear member, other latching means secured to said extensions, and means for simultaneously releasing all of said latching means.

3. Dog starting apparatus comprising a harness having a part extending longitudinally of a dog, a linear member having a transverse member provided with a plurality of latch members spaced apart thereon and engaging said longitudinally extending part of the harness at spaced locations, and means for simultaneously releasing said latch members.

4. Dog starting apparatus comprising an indicia carrying harness having a part extending longitudinally of a dog, a linear member having a transverse member, latch members spaced apart on said transverse member and engaging said longitudinally extending part, and means for simultaneously releasing said latch members.

5. Dog starting apparatus comprising a linear member, transverse members arranged thereon, frame members spaced apart on said transverse members, latches on said frame members, harnesses about dogs and adapted to be engaged by said latches, and means on said linear member for releasing said latches.

6. Dog starting apparatus comprising a linear member, transverse members arranged thereon, frame members spaced apart on said transverse members and adjustable thereon, latches on said frame members, harnesses for dogs and having parts engaged by said latches, and means for releasing said latches.

7. In a dog starting apparatus comprising a plurality of body harnesses, a plurality of harness holding parts each having spaced apart latch means for engaging one of said harnesses, means for releasing said latch means simultaneously, a support for said harness holding parts and latch means, means on said support for operating said release means, an electric circuit having therein a contact means on said operating means and adapted to be opened and closed upon actuation of said operating means and a timing mechanism controlled by the electric circuit.

8. Racing harness comprising a longitudinal strap and straps encircling the body of a dog, one of said encircling straps being in front and two of said encircling straps at the rear of the dog's front legs, latch engaging projections at the intersections of the two rear encircling straps with said longitudinal strap, and an identification member upon said harness at a side of the dog, said identification member extending from one rear encircling strap to the other and being removably secured thereto.

9. A boom mounted transversely of a dog racing track and having a plurality of latch means therealong each for engaging extensions upon a dog's racing harness, and means on said boom for actuating said latch means to free such harness.

10. A harness comprising body engaging members disposed at the front and rear of a dog's front legs and having means for attaching the harness to a starting device, in combination with a dog starting device comprising latch means engaging the attaching means of said harness, a substantially rigid support for said latch means, and means on said support for releasing said attaching means from said latch means.

11. Dog starting apparatus comprising a rigidly supported linear member having spaced apart latch members rigidly secured thereto, dog harness extending longitudinally of a dog and having parts engageable with said latch members, and means for disengaging said latching members from said harness.

12. In a dog starting apparatus, a linear member, transverse extensions thereon at spaced intervals, latch means adjustably secured to said linear member, other latch means adjustably secured to said extensions, and means for simultaneously releasing all of said latch means, said release means comprising an operating rod upon said linear member and members movable relatively to and operatively connected to said operating rod for actuating said latch means, said members maintaining an operative connection with said latch means irrespective of their adjustment relative to said linear member and to said extensions.

13. A starting device comprising a harness extending longitudinally of a dog, a linear member, latches for said harness spaced apart on said linear member, and means at one end of said linear member and connected to said latches for simultaneously releasing all of said latches.

THOMAS A. KEEN.